No. 616,025. Patented Dec. 13, 1898.
L. E. STANFORD.
LIQUID SEAL TRAP.
(Application filed May 4, 1898.)
(No Model.)
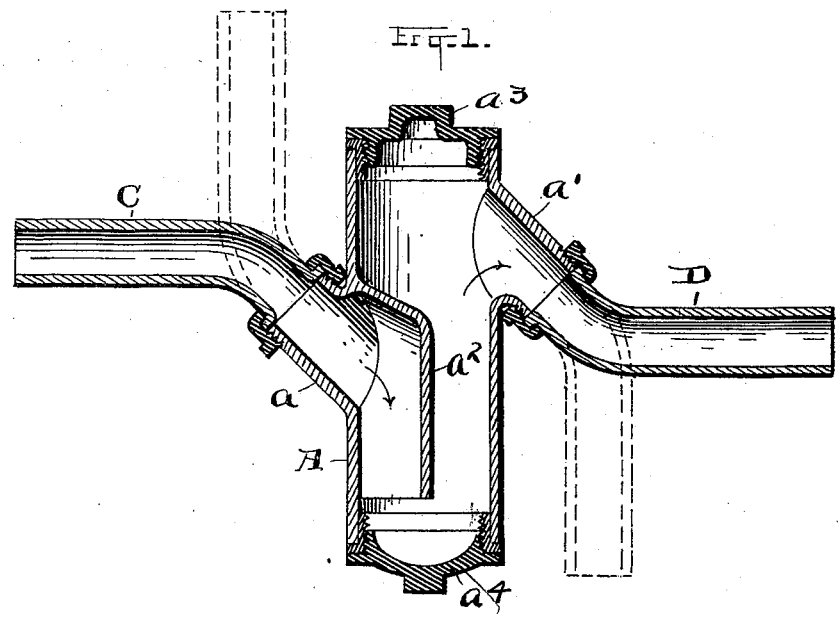
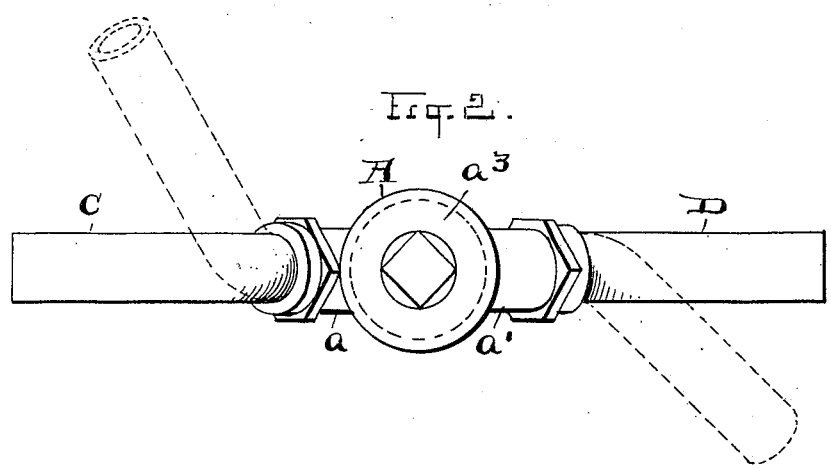
ATTEST
INVENTOR
Leland E. Stanford.
By H. F. Fisher ATTY
THE NORRIS PETERS CO., PHOTO-LITHO., WASHINGTON, D. C.

UNITED STATES PATENT OFFICE.

LELAND E. STANFORD, OF AKRON, OHIO, ASSIGNOR OF TWO-THIRDS TO JOHN GRETHER AND JOHN E. STEHLE, OF SAME PLACE.

LIQUID-SEAL TRAP.

SPECIFICATION forming part of Letters Patent No. 616,025, dated December 13, 1898.

Application filed May 4, 1898. Serial No. 679,677. (No model.)

*To all whom it may concern:*

Be it known that I, LELAND E. STANFORD, a citizen of the United States, residing at Akron, in the county of Summit and State of Ohio, have invented certain new and useful Improvements in Liquid-Seal Traps; and I do declare that the following is a full, clear, and exact description of the invention, which will enable others skilled in the art to which it appertains to make and use the same.

My invention relates to convertible liquid-seal traps of the kind adapted to sinks, washbasins, and the like; and the object of the invention is to provide what may be regarded as a universal trap for these purposes, being designed to serve in all the possible positions and relations that such traps are required to occupy and which are so varied and different that hitherto a number of different styles of traps have been required to meet them all. For example, some places required what is known as a "running-trap," others an S-trap, others a P-trap, and so on. This invention is designed to meet all these several needs and is convertible into any one of the several forms named, as well as into others, having altogether a very wide range of adaptability and serving an equally good purpose into whatsoever form it may be converted.

To these several ends the invention consists in a convertible liquid-seal trap constructed and operating substantially as shown and described, and particularly pointed out in the claims.

In the accompanying drawings, Figure 1 is a vertical central sectional elevation of my improved trap, and Fig. 2 is a plan view thereof.

A represents the body of the trap, which in this instance is shown as barrel-shaped or cylindrical; but the shape of the body may be varied from this to any other practicable shape and still be within my invention. However, the present shape or form is preferred and generally used by me. The said body A is provided with two shoulders $a$ and $a'$ on opposite sides and arranged relatively about as shown, so that the bottom of the outlet-shoulder $a'$ is substantially on the same plane horizontally as the top of the inlet-shoulder $a$. Intermediate of these shoulders is the diaphragm $a^2$, which has sufficient dip or depth in the trap to form a perfect water seal. The ends of the body may be closed in any good mechanical way, and both end caps $a^3$ and $a^4$ can be removed, so as to afford an open way through the body for cleansing it.

An essential and novel feature of the invention is the angle of the shoulders $a$ and $a'$ to the body A, said shoulders being purposely placed at exactly forty-five degrees to the axis of the said body and projected in opposite direction—that is, the shoulder $a$ projects upward and the projection $a'$ downward at an angle of forty-five degrees to the axis of body A, and therefore at right angles to the axis of said shoulders. This gives a long side and a short side to each shoulder, and the extremity of each shoulder is constructed to make a close water-joint with its attached elbows C and D. The said elbows C and D are alike and hence interchangeable, and are each formed with a bend at its inner end of such degree that they can be turned to occupy a horizontal position, as seen in full lines, Fig. 1, or to occupy a vertical position, as seen in dotted lines; or they may be turned to occupy a half-way or other intermediate position between these extremes; but in such case their axes will be at an inclination to a vertical plane and projected more or less laterally from the body A.

When the elbows C and D are in the position of full lines, Fig. 1, they constitute what is known as a "running-trap," and when in the position of the dotted lines they constitute an S-trap. Other forms of trap may be produced by setting one or both elbows at different angles, and, as is now evident, a very wide range of adaptability is afforded by a trap constructed on this principle and which responds to every demand of this class of traps. For this reason a plumber need not, as heretofore, carry a stock of several kinds of traps for different conditions or settings, but can supply all demands by this single form of trap.

Any suitable water-tight joint may be used to connect up the said elbows to the body, and a wipe-joint can, if preferred, be made with their outer extremities.

Finally, it is to be noted that it is not sought to produce a new style of trap as such, but to provide an assemblage of parts so constructed and arranged that they can be made to reproduce any one or all of the well-known and popular styles of rigid traps, and which by reason of their rigidity are confined each to a certain limited use.

What I claim is—

1. As a new article of manufacture, the body of the trap having open ends and caps on said ends and a central vertical diaphragm between the inlet and outlet sides and oppositely-projecting inlet and outlet shoulders at corresponding inclinations to the axis of the body and having their edges in parallel planes, substantially as described.

2. As a new article of manufacture, a liquid-seal trap having inlet and outlet openings on opposite sides near its middle portion and shoulders about said openings projecting at an angle of substantially forty-five degrees to the vertical axis of the trap, and having their edges in parallel planes and at right angles to the axis of said shoulders, and pipe-joints for said shoulders having each a curved extremity and adjustably secured on said shoulders, whereby said joints are adjustable to different angles, substantially as described.

3. The trap having a cylindrical body and an upwardly-projecting shoulder at one side inclined at an angle of about forty-five degrees to the axis of the body and a diaphragm inside over said entrance, and having on its opposite side a downwardly-projecting discharge-shoulder at an angle of about forty-five degrees to the axis of the body, said projections having their edges $a^5$ in parallel planes, in combination with the elbows C and D on said shoulders curved between their ends sufficiently to take both a vertical and a horizontal position in respect to the body of the trap, substantially as described.

Witness my hand to the foregoing specification this 25th day of April, 1898.

LELAND E. STANFORD.

Witnesses:
 C. S. FERGUSON,
 T. W. WAKEMAN.